No. 743,044. PATENTED NOV. 3, 1903.
J. D. SPENCE.
DYNAMO.
APPLICATION FILED SEPT. 28, 1901.
NO MODEL.
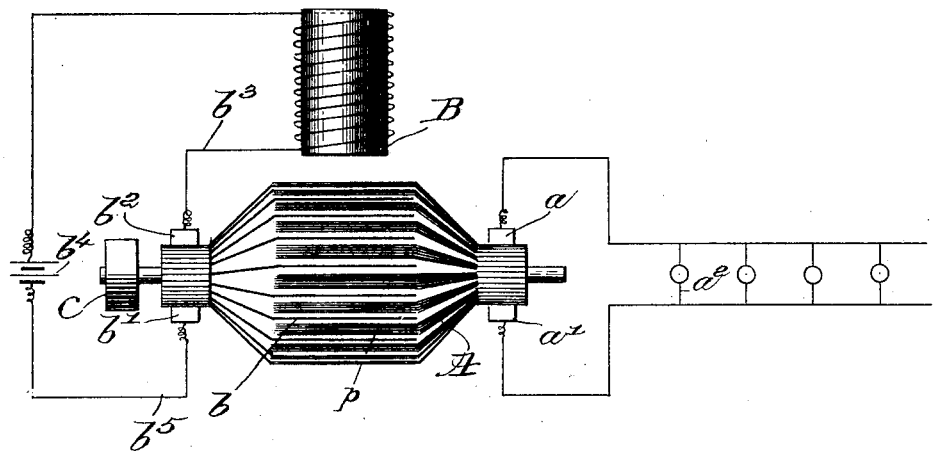
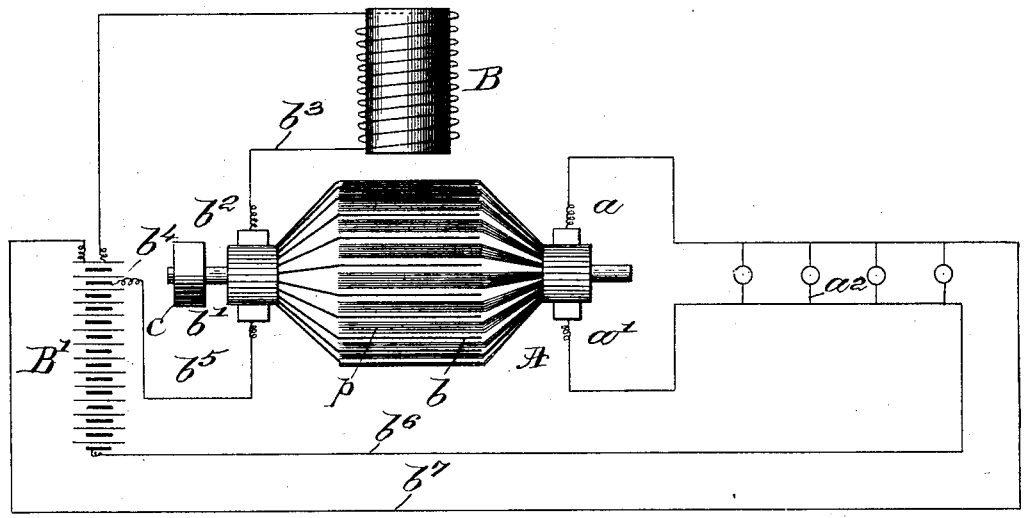
Witnesses.
Thomas J. Drummond.
Adolph F. Kaiser.
Inventor.
John D. Spence,
by Crosby Gregory.
attys.

No. 743,044. Patented November 3, 1903.

UNITED STATES PATENT OFFICE.

JOHN D. SPENCE, OF SOMERVILLE, MASSACHUSETTS, ASSIGNOR TO CHARLES L. COTTON, OF DEDHAM, MASSACHUSETTS.

DYNAMO.

SPECIFICATION forming part of Letters Patent No. 743,044, dated November 3, 1903.

Application filed September 28, 1901. Serial No. 76,937. (No model.)

*To all whom it may concern:*

Be it known that I, JOHN D. SPENCE, a citizen of the United States, residing at Somerville, county of Middlesex, State of Massachusetts, have invented an Improvement in Dynamos, of which the following description, in connection with the accompanying drawings, is a specification, like letters on the drawings representing like parts.

My invention is an electric generator of special construction, and has for its object the provision of means for automatically maintaining a constant voltage and preventing the dynamo from burning itself out under unusual conditions, and is especially adapted to situations where the dynamo is liable to be run at widely-varying speeds.

Briefly stated, my invention resides in having one of the windings of a compound-wound armature used for the field excitation in connection with a secondary battery, and my invention is particularly adapted for use in connection with storage-battery plants, rendering the operation of the latter much more simple, efficient, and economical than has heretofore been considered feasible.

The automatic regulation of the voltage of the dynamo according to my invention is produced by the variation in the field strength caused by the fluctuation in electromotive force in the secondary armature-winding in the field-circuit of the dynamo, which operates as a variable resistance in the circuit of the battery in said field-winding circuit, or, in other words, the regulation is due to a balance in potential between the battery and the generator.

My invention and the constructional details thereof will be more fully understood from the following description, reference being had to the accompanying drawings, in which I have illustrated a preferred embodiment of my invention.

In the drawings, Figure 1 represents, largely diagrammatically, my invention applied to a generator; and Fig. 2 is a similar view showing the same in connection with a storage-battery plant.

Let A represent a compound-wound armature, and B the field or one of the field-cores thereof.

The service-line is connected to the primary winding $p$ of the armature at the brushes $a$ $a'$ and is shown as operating lamps $a^2$ or any other translating device for performing any other work which may be required of it. The secondary winding $b$ of the armature is led by brushes $b'$ $b^2$ to the field-winding $b^3$, which is wound around the core B and includes in its circuit a secondary battery $b^4$, one side of which is connected to the field-winding and the other side by a wire $b^5$ to the brush $b'$. If the speed of the armature should become excessive, the strength of the field would be decreased by the opposition of the armature-winding, whereas if the speed of the armature decreases the battery will supply a strong field. In the present instance the battery-current produces the armature-field, the latter being wound properly for this purpose, and when the speed of the armature increases the electromotive force generated thereby in the secondary winding flows in opposition to said battery-current and tends to neutralize the same, thereby decreasing the field strength, whereas when an appreciable current is not being generated by the secondary armature-winding then the full strength of the battery is producing a strong field.

Broadly stated then, my invention resides in exciting the field by means of two opposed electromotive forces, one of which is constant and the other variable, and while I have shown the battery as providing the constant electromotive force and the secondary winding as providing the variable electromotive force in opposition thereto it will be noted that certain of my broader claims are not limited thereto, but include the opposing of a variable to a constant electromotive force, whether derived in this preferred manner or not.

In the illustration shown in Fig. 2 my invention is shown applied to a storage-battery plant, in which there is shown in series with the battery $b^4$ a large number of batteries B', connected by service-wires $b^6$ $b^7$ to the main service-wires or line-circuit of the generator. It will be seen, therefore, that the current produced by the generator charges the battery B', which in turn operates any translating devices $a^2$ which may be in the circuit, and also it will be seen that the system is automatic in giving an element of safety to the dynamo, which can never be overloaded or suddenly burned out, because a portion of said battery—namely, the part $b^4$—always governs the potential of the generator, as already explained, and this governing portion of the battery is in the same condition as the rest of the battery, and hence it maintains the requisite conditions therefor in the dynamo. If the battery B' is low in potential, so will be the part $b^4$, or if it has high potential the part $b^4$ likewise has high potential, and therefore the dynamo voltage will always vary the same as the battery voltage varies. I believe that I am the first to produce a dynamo having this capability.

Having described my invention, what I claim as new, and desire to secure by Letters Patent, is—

1. A dynamo having a compound-wound armature, a single field therefor, said compound-wound armature having one winding for a service-current and one winding in series with the field-winding, said field-winding having in its circuit a secondary battery for producing the magnetic field of the dynamo.

2. A dynamo having a single field and its field-current supplied from a secondary battery charged by the dynamo itself, and means for cutting down said field-current from said battery directly as the speed of the armature increases above normal.

3. A dynamo containing a compound-wound armature, a single field for said compound armature having a field-winding in series with one of said armature-windings, and means operated in connection therewith in the circuit of said field-winding for varying the strength of the field inversely and in proportion to the variations in speed of the armature.

4. The combination with a dynamo containing a compound-wound armature, a single field for said compound armature and a series of secondary batteries charged by said dynamo, of means responsive to the voltage of said batteries for correspondingly varying the voltage generated by the dynamo.

5. A dynamo having a compound-wound armature, and a single field for said compound armature having its winding impressed with two opposed electromotive forces, one variable and the other constant, the variable electromotive force being derived from one of said armature-windings.

6. A dynamo having a compound-wound armature, a single field for said compound armature, one of the windings of said compound armature being in series with the single field and having in circuit a secondary battery.

7. A dynamo having a compound-wound armature, one winding being in connection with brushes at one end of the dynamo for a service-current, and one winding being in connection with brushes at the opposite end of the dynamo in series with the field-winding, said field-winding having in its circuit a secondary battery for producing the magnetic field of the dynamo.

In testimony whereof I have signed my name to this specification in the presence of two subscribing witnesses.

JOHN D. SPENCE.

Witnesses:
GEO. H. MAXWELL,
L. M. COTTON.